Oct. 11, 1949.                    C. R. COWLEY                    2,484,688
                          ADAPTER FOR SEALING-IN MACHINES
Filed Aug. 26, 1946                                               2 Sheets-Sheet 2

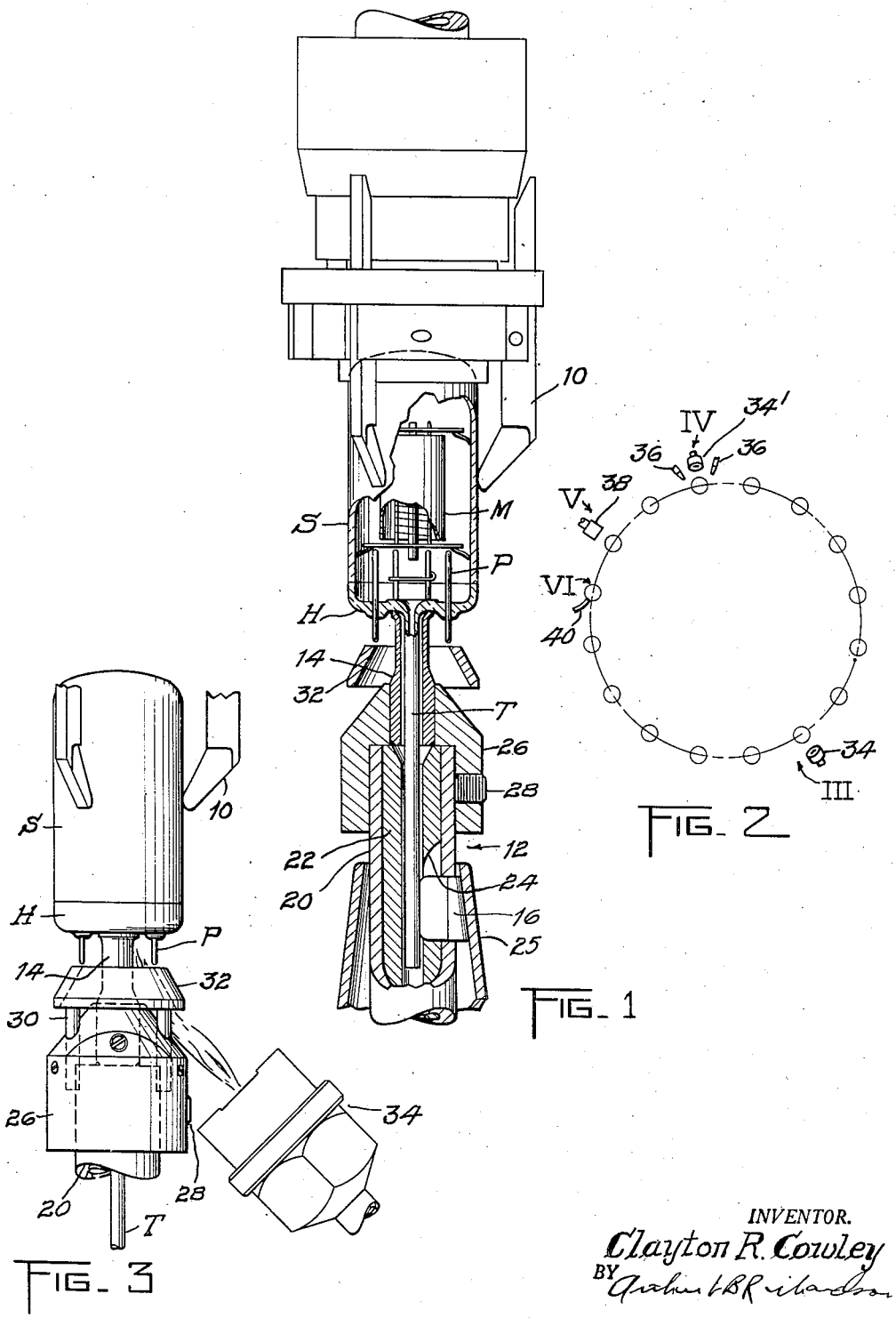

INVENTOR.
Clayton R. Cowley
BY
His Attorney

Patented Oct. 11, 1949

2,484,688

UNITED STATES PATENT OFFICE 2,484,688

ADAPTER FOR SEALING-IN MACHINES

Clayton R. Cowley, Emporium, Pa., assignor to Sylvania Electric Products, Inc., a corporation of Massachusetts Application August 26, 1946, Serial No. 693,146

9 Claims. (Cl. 49—2)

This invention relates to the sealing operation in the manufacture of glass envelopes, particularly for radio tubes, and to apparatus therefor.

In the manufacture of radio tubes of several types the envelope is formed by sealing a shell to a glass header having an exhaust tubulation. The header is complete with through leads for the internal elements of the tube. The assembly of elements, called the "mount," is supported by the leads. The shell is placed over the mount, and the shell-and-header assembly is rotated while the edges to be joined are exposed to sealing flames. Machines for performing such operations have come to be known as "Sealex" machines.

Heretofore the most common method of sealing a shell to a header of the type having an exhaust tubulation has included the use of an electric preheater as a piece of equipment auxiliary to the machine on which the seals are made. The header, of soft commercial glass, is preheated to a temperature above its strain point. This method is a costly one as it requires a separate piece of equipment, entails a large additional power cost and a separate operator for the preheating equipment, and results in loss of time for the "Sealex" machine whenever the preheater breaks down. Its use exposes the header to excessive handling that causes breakage and electrical defects. The mount is also exposed directly to the high temperatures within the preheating apparatus, increasing the possibility of contamination of the parts due to oxidation and requiring special design to withstand this heating. Furthermore, heat radiating from the preheater creates uncomfortable working conditions for both the operator of this auxiliary device and the one handling the adjacent "Sealex" machine.

An object of my invention is the elimination of the above-mentioned preheating equipment with all its objectionable characteristics. In the accomplishment of this object I propose to preheat the glass cup or wafer forming part of the header directly on a "Sealex" machine through the use of a special work support. By means of properly adjusted and directed flames the wafer (the generally flat part of the header) is gradually heated to a temperature at which direct sealing-in fires may be used without cracking the glass. During this period the soft glass exhaust tubulation is protected against excessive heating, to avoid premature sealing-off and for other reasons that will appear.

Another object of the invention is to control the heating pattern of the header and thereby induce an advantageous mildly compressional strain pattern until the temperature of the glass has reached its strain point. This is accomplished by the particular construction of the combined flame-directing and work-holding member and by control of the preheating fires.

Another object of the invention is to produce a slight but permanent compressional strain pattern in the header while the seal between header and shell is relatively hot and in the process of initially being annealed. This is effected by directing an air stream against the central portion of the outside surface of the header to rapidly cool this area.

A further object of the invention is the provision of an improved work-holding unit as an adapter for "Sealex" machines, which is of simple, practical and durable construction.

A further object is the provision of a header support on a spindle that will enable direct contact of a flame, from a burner lateral of the spindle, with an inner area of the header whether tubulated or not.

The essential features of the invention will be gathered from the foregoing and from the appended claims. A preferred form of the invention to enable a better understanding is shown in the following drawings in which:

Fig. 1 represents a spindle of an envelope sealing machine supporting a novel adapter and a radio tube before the seal is made, several of the parts being shown in section;

Fig. 2 is a diagrammatic view of a series of spindles at successive stations of an indexable seal-forming turret, or improved sealing machine;

Figure 4:
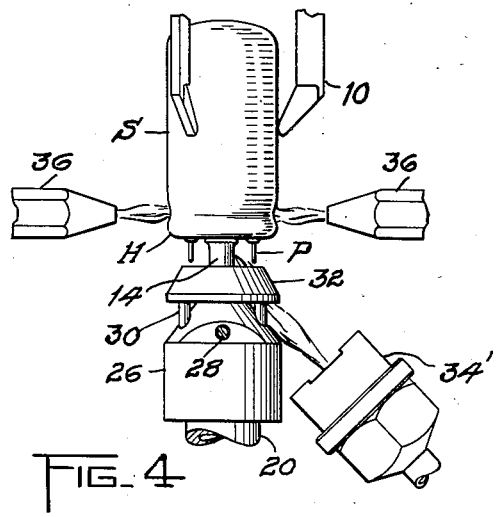
Figure 5:
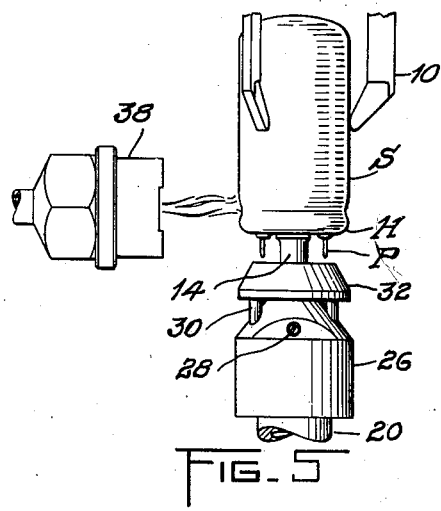
Figure 6:
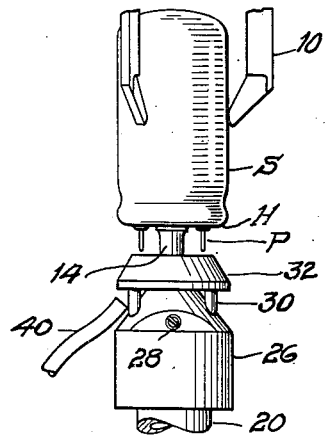
Figure 7:
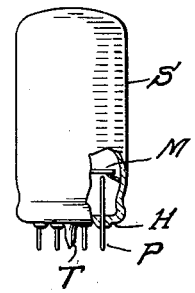

Figs. 3 to 6 inclusive are illustrations of the radio tube on the novel adapter in the course of its seal-forming operation; and Fig. 7 is a view of the completed radio tube, showing not merely the seal but also the tipped-off exhaust tubulation. The tube is partly in section to show the fused joint.

In Fig. 1 there is shown a radio tube preliminary to seal formation which tube includes a shell S, a header H which carries mount M, metal pins P forming external terminals for the mount, and an exhaust tubulation T. The upper part of header H, excluding the exhaust tubulation and the pins, is usually called the wafer. Header H is manually loaded into the machine at a time when chuck 12 of the "Sealex" spindle is released, the header at that time being supported on heat-resistant tube 14 of the novel adapter.

Shell S is also assembled on mount M and in contact with header H as a preliminary manual operation while shell chuck 10 of the "Sealex" machine is vertically spaced from the shell. Chucks 10 and 12 comprise the spindle which rotates the radio tube more or less continuously during the seal-forming operations at the several stations to be described. Axially slidable cylinder 22 within cylinder 20 of chuck 12 has three cam portions 24 (only one of which is shown). Cylinder 22 is moved downward relative to cylinder 20, by mechanism forming no part of the present invention, for positively retracting jaws 16, thus facilitating the unloading and renewed loading of the spindles. Conical sleeve 25 causes jaws 16 to grip tubulation T at other times.

The novel adapter is provided for supporting the header on the spindle initially and for controlling the flow of heating and cooling gases. This adapter comprises heat-resistant hollow metal case or tube 14, previously mentioned, secured within cap 26 which is fixed by set screws 28 to cylinder 20 of the "Sealex" spindle. Rods 30 projecting axially from cap 26 (see Fig. 3) support ring 32 which is internally tapered and arranged at its upper edge to protect terminal pins P from the hottest part of the flame. Ring 32 is in effect a frustum of a hollow cone. The upper surface of cap 26 is also conical or tapered although somewhat flatter in angle, and these two surfaces define a passage for header-heating flames in the first operations, and in a later operation for header-cooling air. The nature of this spindle adapter and of the mode of temperature control will be apparent from the description of the sequence of operations below.

A plurality of spindles such as that shown in Fig. 1 are continuously rotated and caused to progress gradually from the loading station to the successive heating, sealing, and cooling stations, and ultimately to the unloading position. In Fig. 2 the assembled shells and headers are carried to station III for preliminary heating of header H as shown in Fig. 3, and through seven additional preliminary header-heating positions. At station No. IV and the one succeeding station, sealing-in flames are brought into play (see Fig. 4) for making the seal, while at station V there is a less intense flame (see Fig. 5) for annealing the seal, followed by station VI (see Fig. 6) where cooling air is blown at the central portion of header H. During all of these operations the spindles are maintained in rotation so that the heating and cooling operations are uniform about the tube.

The burner arrangement in station III is shown in Fig. 3. The flame from burner 34 is directed upward between cap 26 and ring 32. Tube 14 prevents this flame from impinging on exhaust tube T. The flame, or the burned gases, reach the wafer very near the exhaust tubulation and then flow generally radially outward. This arrangement provides ideal heating of the header, which heating is gradually made more intense as its spindle progresses from one burner to the next along the eight preliminary heating stations. At station IV, where the additional sealing-in burners 36 become effective, a burner 34' like burner 34 is directed toward the bottom of the header. A slight axially vibratory motion is imparted to chuck 12 to "work" the fused glass. This sealing operation has the tendency of forming a thickening of glass which would cause unnecessary cooling strains unless the thickening is eliminated. By means of cams (not shown) the separation between chucks 10 and 12 is increased just after the station following station IV, to stretch the fused joint and eliminate this thickening. Softening of tubulation T which would nullify the vibration and this separating "pull," and might cause premature tipping off, is prevented by tube 14.

Station V, the heater 38 of which is shown in Fig. 5, is for annealing and is quite conventional. This figure shows the position of the annealing flame relative to the other flames.

In Fig. 6 tube 40 directs a jet of cooling air between cap 26 and ring 32 for cooling the center of the header relatively rapidly, thus keeping pace with the cooling of the shell, the seal, and the header periphery, and in addition establishing a mild compressional strain pattern in the wafer.

What I claim is:

1. An adaptor for the spindle of a machine for sealing a shell to a tubulated header wherein the spindle is rotated continuously as it progresses to preheating, fusing, and cooling stations successively, said adaptor including a fire-resistant tube for encasing the tubulation of the header, an externally conical member symmetrical about said tube with the narrow part thereof spaced a short distance from the end of said tube and the wider part thereof spaced further from said end, a hollow conical member between said first conical member and the end of the tube, said second member being symmetrically spaced from said tube, whereby said conical members constitute an annular channel for directing heating gases generally toward the junction of the tubulation with the remainder of the header and for similarly directing cooling gases.

2. In a machine for sealing a shell to a glass header having a central axial tubulation, a spindle comprising a hollow case for encasing the tubulation, and means forming a conical annular passage directing heating and cooling gases from a source lateral of the spindle toward the end of the case at the junction of the header with its tubulation.

3. An adaptor for th spindle of a machine for sealing a shell to a wafer having a circular series of pins and an axial exhaust tubulation, said adaptor comprising a generally conical end member for said spindle, a tubular case for the tubulation projecting axially from said member, and a hollow ring having a conical inner surface and being symmetrically spaced from said case and supported between said member and the end of said case in such manner as to direct a jet of gases toward the junction of said wafer and said tubulation, the smaller end of the conical inner surface of said ring having a diameter less than the diameter of the circle on which said circular series of said pins lies, whereby the ends of said pins are protected from direct contact by the jet of gases.

4. An adapter for the spindle of a machine for sealing a shell to a wafer having a circular series of pins and an axial exhaust tubulation, said adapter comprising a generally conical end member for said spindle, a tubular case for the tubulation projecting axially from said member and a hollow ring having a conical inner surface and being symmetrically spaced from said case and supported between said member and the end of said case in such manner as to direct a jet of gases toward the junction of said wafer and said tubulation.

5. An adapter for the spindle of a shell-to-header sealing machine, the header comprising a wafer with a circular series of pins and an axial tubulation, said adapter comprising a case for said tubulation and an internally tapered shield for said pins mounted coaxially about said case, and forming a passage, whereby a preheating flame may be directed toward said header between said case and said shield.

6. Apparatus for treating glass headers and the like comprising a rotatable spindle, a support on said spindle for supporting the header, and conical members coaxially arranged with respect to said support for directing a jet of gases from a source lateral of said spindle into an essentially axial direction impinging on the header initially inward of the periphery thereof whereby an inner area of the header may be more directly exposed to the jet of gases from the lateral source than the outer periphery of the header.

7. Apparatus according to claim 6 in which the header has sealed-in leads and said conical members incorporate portions shielding the leads from initial contact with the jet.

8. An adapter for a spindle in a machine for operating upon the headers for electron discharge devices and the like comprising a header support and tapered conical members coaxially arranged with respect to said support, and supported on said spindle deflecting a jet of gases from a position lateral of said support into a generally axial direction impinging on the header inward of the periphery thereof.

9. Apparatus according to claim 8 in which the header has sealed-in leads and said adapter incorporates means shielding the leads from initial contact with the jet.

CLAYTON R. COWLEY.

REFERENCES CITED

The following references are of record in the file of this patent:

UNITED STATES PATENTS

| Number | Name | Date |
|---|---|---|
| 1,542,365 | Barnigan | June 16, 1925 |
| 1,694,368 | Bohner | Dec. 11, 1928 |
| 2,143,708 | Muller et al. | Jan. 10, 1939 |
| 2,215,644 | Hays | Sept. 24, 1940 |
| 2,218,254 | Wengel | Oct. 15, 1940 |
| 2,296,579 | Seelen | Sept. 22, 1942 |
| 2,321,600 | Horn | June 15, 1943 |
| 2,349,822 | Gardner | May 30, 1944 |
| 2,396,801 | Morand | Mar. 19, 1946 |
| 2,413,766 | Henzl | Jan. 7, 1947 |
| 2,434,664 | Mallory | Jan. 20, 1948 |